(No Model.)

F. S. R. PRENTISS.
NECKTIE FASTENER.

No. 314,396. Patented Mar. 24, 1885.

Attest:
Court A. Cooper,
H. E. Hansmann.

Frank S. R. Prentiss
Inventor:
By Foster & Freeman
Attorneys

UNITED STATES PATENT OFFICE.

FRANK S. R. PRENTISS, OF DENVER, COLORADO, ASSIGNOR TO GEORGE H. BRAMAN AND MERRITT W. GANO, OF SAME PLACE.

NECKTIE-FASTENER.

SPECIFICATION forming part of Letters Patent No. 314,396, dated March 24, 1885.

Application filed December 10, 1884. (No model.)

*To all whom it may concern:*

Be it known that I, FRANK S. R. PRENTISS, a citizen of the United States, residing at Denver, in the county of Arapahoe and State of Colorado, have invented certain new and useful Improvements in Necktie-Fasteners, of which the following is a specification.

My invention is a fastener for neckties, consisting of a coiled strip adapted for ready application to the collar and carrying a hook which secures the necktie when the latter is passed around the collar.

Figure 1:
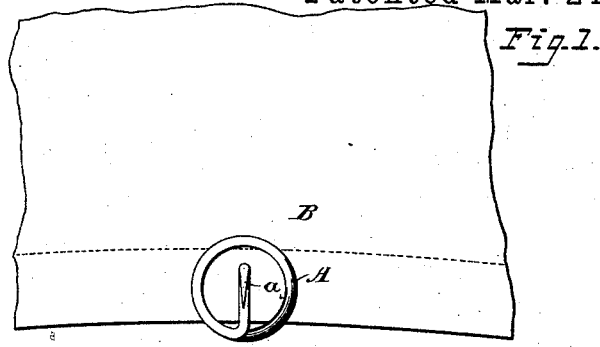
Figure 2:
Figure 3:
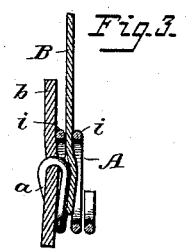
Figure 4:
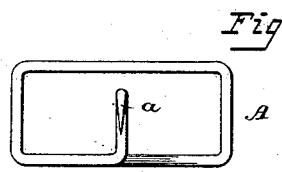
Figure 5:
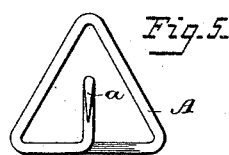
Figure 6:
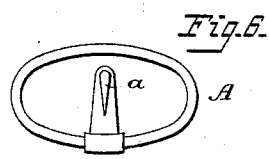

In the drawings, Figure 1 is a view showing part of a collar with my improved retaining device applied thereto. Fig. 2 is an edge view of the retainer. Fig. 3 is a section showing the collar, retainer, and neck-tie. Figs. 4, 5, and 6 are views illustrating modifications.

The fastening consists, essentially, of a coiled strip, A, consisting of a strip of wire of suitable form, (a round wire strip being shown in the drawings,) and a hook or catch, $a$, which may be formed, as shown in Figs. 1 to 5, by turning up and sharpening one end of the wire strip, or it may be upon a separate piece attached to the end of the strip, as shown in Fig. 6. It is essential that there should be two or more coils, $i$, so as to afford a means of clasping the collar B, which is introduced between the said coils, as shown in Figs. 1 and 3, the latter springing apart to receive the collar, and clasping the latter with such firmness as to retain the device in this position. The hooked portion $a$ of the device is preferably bent back into the coil, so as to cause a bend in the collar when the latter is passed downward between the coils, as shown in Fig. 3, this bending of the collar tending to insure the retention of the device in its place.

The device may be placed at the back of the collar or at the front near the stud; or two of them may be placed, one on either side of the stud, and will be retained in position with the hook extending outward, so that the same will penetrate the band $b$ of the necktie when the latter is passed around the collar, and will effectually retain the same in position. The form of the coil is not material, as the strip may be coiled into a circle, as shown in Figs. 1, 2, and 3, or to an oblong form, as shown in Fig. 4; or it may be in the form of a triangle, as shown in Fig. 5, or of an oval, as shown in Fig. 6.

It will be seen that the device above described may be readily connected to the collar in any desired position, that it will not injure the tie, that it will be perfectly concealed by the latter, and will occasion no inconvenience to the wearer.

Without limiting myself to any special arrangement of the coil, I claim—

1. The combination, in a necktie-fastener, of a strip of metal bent in the form of a coil and a retaining-hook, $a$, extending radially from the edge toward the center of the coil, for the purpose specified.

2. A retainer for neckties, consisting of a strip of metal bent into a coil terminating at one end in a hook extending radially from the edge toward the center of the coil and bent back into the latter, whereby the collar is bent by the hook and securely held when placed between the coils, substantially as set forth.

In testimony whereof I have signed my name to this specification in the presence of two subscribing witnesses.

FRANK S. R. PRENTISS.

Witnesses:
CHARLES M. CAMPBELL,
ROBERT MCARTHUR.